United States Patent [19]

Matsumoto et al.

[11] Patent Number: 4,843,056

[45] Date of Patent: Jun. 27, 1989

[54] EXHAUST GAS PURIFYING CATALYST AND PROCESS FOR PRODUCING THE SAME

[75] Inventors: Shinichi Matsumoto, Aichi; Naoto Miyoshi; Hideaki Muraki, both of Nagoya; Hideo Sobukawa; Masayuki Fukui, both of Aichi; Mareo Kimura, Nagoya; Hirofumi Shinjoh, Aichi, all of Japan

[73] Assignees: Kabushiki Kaisha Toyota Chuo Kenkusho; Toyota Jidosha Kabushiki Kaisha, both of Japan

[21] Appl. No.: 164,237

[22] Filed: Mar. 4, 1988

[30] Foreign Application Priority Data

Mar. 5, 1987 [JP] Japan .................................. 62-51096
May 15, 1987 [JP] Japan ................................. 62-119765

[51] Int. Cl.$^4$ ............................................. B01J 23/00
[52] U.S. Cl. .................... 502/302; 502/303; 502/304
[58] Field of Search ...................... 502/302, 303, 304

[56] References Cited

U.S. PATENT DOCUMENTS

| | | | |
|---|---|---|---|
| 3,892,836 | 7/1975 | Compton et al. | 502/304 |
| 4,157,316 | 6/1979 | Thompson et al. | 502/304 |
| 4,170,573 | 10/1979 | Ernest et al. | 502/304 |
| 4,316,822 | 2/1982 | Fujitani et al. | 502/304 |
| 4,581,343 | 4/1986 | Blanchard et al. | 502/303 |
| 4,585,752 | 4/1986 | Ernest | 502/304 |
| 4,639,432 | 1/1987 | Holt et al. | 502/303 |
| 4,711,870 | 12/1987 | Yamada et al. | 502/303 |

FOREIGN PATENT DOCUMENTS

| | | | |
|---|---|---|---|
| 322350 | 12/1983 | Fed. Rep. of Germany | 503/304 |
| 55-11043 | 1/1980 | Japan . | |
| 55-22357 | 2/1980 | Japan . | |

*Primary Examiner*—Patrick P. Garvin
*Assistant Examiner*—E. D. Irzinski
*Attorney, Agent, or Firm*—Berman, Aisenberg & Platt

[57] ABSTRACT

An exhaust gas purifying catalyst for oxidizing HC and CO and for reducing NOx is provided, which comprises at least one oxide of rare earth element, rhodium, and at least one of platinum and palladium loaded on alumina grains. The major amount of rhodium is dispersed on the oxide of rare earth element. Thus, the rhodium solidification into the alumina grains is prevented. Further, when cerium oxide accompanying lanthanum oxide, neodymium oxide or a mixture thereof is used as the oxide of rare earth element, the sintering of cerium oxide or palladium at a high temperature is suppressed since it forms a complex oxide with lanthanum oxide, neodymium oxide or a mixture thereof. Additionally, when stabilized alumina grains in which a rare earth element and an alkali earth element are present in a solid solution state are used, the deterioration of NOx purifying activity of the catalyst at a high temperature is suppressed. The exhaust gas purifying catalyst of this invention has high durability as well as high activity at a high temperature.

17 Claims, No Drawings

EXHAUST GAS PURIFYING CATALYST AND PROCESS FOR PRODUCING THE SAME

BACKGROUND OF THE INVENTION

1. Field of the Invention

This invention relates to an exhaust gas purifying catalyst for an internal combustion engine and a process for producing the same.

2. Discussion of the Background

An exhaust gas purifying catalyst for an internal combustion engine, especially for an automobile, must have an extremely high performance in its durability and purifying ability. A monolithic catalyst and a granular catalyst have been used for the purpose.

As for the catalyst component, at least one noble metal, such as platinum (Pt), rhodium (Rh) and palladium (PD) is, carried on a catalyst support. After installing the catalyst support carrying the catalyst component thereon to a catalyst converter and letting exhaust gas go through, harmful materials like hydrocarbons (HC), carbon monoxide (CO) and nitrogen oxide (NOx) contained in the exhaust gas are purified by oxidation and reduction reactions.

The catalyst is called a 3-way catalyst, since it can purify HC, CO and NOx. A conventional catalyst has been known in which rhodium, an oxide of a rare earth element, and a metal of platinum group elements other than rhodium are dispersed on alumina grains. An as disclosed in Japanese Unexamined Patent Pulbication (KOKAI) No. 11147/1986, a catalyst is proposed in which rhodium is dispersed on alumina grains free from oxide of a rare earth element. Further, as disclosed in Japanese Unexamined Patent Publication (KOKAI) No. 130230/1981, a catalyst is proposed which contains palladium with cerium oxide added. Furthermore, as disclosed in Japanese Unexamined Patent Publication (KOKAI) No. 54730/1985, a catalyst is proposed in which cerium oxide is added to a 3-way catalyst having palladium as a major component.

In addition, the catalyst components are uniformly carried by the alumina grains in the conventional 3-way catalyst produced by the process described below. In the process for producing the conventional 3-way catalyst, a monolithic catalyst support made of cordierite or the like is first coated with alumina grains. And the monolithic catalyst support coated with the alumina grains is immersed into aqueous solutions of the catalyst component, such as salts of an oxide of a rare earth element, a chloride of rhodium and metals of platinum group elements other than rhodium. And then, the monolithic catalyst support coated with the alumina grains is dried to have the fine grains of the catalyst components carried on the alumina grains. The conventional 3-way catalyst thus produced is used as an exhaust gas purifying catalyst.

SUMMARY OF THE INVENTION

When the conventional exhaust gas purifying catalyst or 3-way catalyst is used at a high temperature, especially when it is used at a temperature of 900° C. or higher, the purifying action of rhodium deteriorates and the purifying activity for NOx decreases remarkably since rhodium solidifies into the alumina grains at a high temperature. Accordingly, it is an object of this invention to solve this problem.

An exhaust gas purifying catalyst for oxidizing HC and CO and for reducing NOx of this invention comprises the following catalyst components: at least one rare earth element, oxide, rhodium, and at least one of the platinum and palladium. The catalytic components are loaded on alumina grains which are loaded on or formed as a catalyst support, and a major amount of rhodium is dispersed on the rare earth element oxide. Thus, rhodium solidification in the alumina grains is prevented. Additionally, when stabilized alumina grains, in which a rare earth element and an alkali earth element are present in solid solution state, are used for the alumina grains, the deterioration of NOx purifying activity of the catalyst at a high temperature is prevented since the growth of crystal grains of the oxide of the rare earth element is suppressed and it suppresses the growth of crystal particles of rhodium loaded on the oxide of the rare earth element.

The exhaust gas purifying catalyst of this invention uses the following as the catalyst components: at least one oxide of rare earth element, rhodium and at least one metal of platinum group other rhodium.

As the oxide of rare earth element, oxide of lanthanoid elements such as lanthanum oxide and neodymium oxide may be used. Cerium oxide is the best to improve catalytic activity among oxides of rare earth elements. In addition, it is preferred to use cerium oxide accompanying either lanthanum oxide or neodymium oxide or a mixture of lanthanum oxide and neodymium oxide as the oxide of rare earth element. If this is the case, the cerium oxide working as a co-catalyst forms a complex oxide with the lanthanum oxide, the neodymium oxide or the mixture of lanthanum oxide and neodymium oxide. Consequently, the deterioration of the NOx purifying activity at a high temperature is suppressed, since the sintering of the cerium oxide is prevented and it suppresses the growth of the crystal particles of the rhodium dispersed on the cerium oxide. Moreover, the sintering of palladium is also suppressed, since the lanthanum oxide, the neodymium oxide or a mixture of lanthanum oxide and neodymium oxide forms a complex oxide $PdO \cdot Ln_2O_3$ ("Ln" represents lanthanum, neodymium or a mixture of lanthanum and neodymium) with palladium.

Rhodium known as a catalyst component for reducing NOx is used also in the exhaust gas purifying catalyst of this invention. As the metal of the platinum group elements other than rhodium, either one of platinum or palladium or both of platinum and palladium may be used in the exhaust gas purifying catalyst of this invention.

It is preferred that the catalyst components are loaded on a catalyst support in the following amounts per a catalyst support of 1 liter volume based on an apparent total volume:

From 0.01 to 3.0 mole of the oxide of rare earth element per a catalyst support of 1 liter volume;

From 0.004 to 1.0 gram of rhodium per a catalyst support of 1 liter volume; and

From 0.04 to 5.0 gram of either one of platinum or palladium or both of platinum and palladium per a catalyst support of 1 liter volume.

Ordinary alumina grains such as alpha-alumina grains, gamma-alumina grains and the like is used for the alumina grains forming a catalyst component carrier. However, it is preferably to use stabilized alumina grains in which a rear earth element solidifies or both of a rare earth element and an alkali earth element solidify.

For the stabilized alumina grains, the following are available:

- a first stabilized alumina grains comprising theta-alumina grains in which from 0.1 to 3 % by mole of lanthanum based on the theta-alumina grains and from 0.01 to 40 times by mole of barium based on the lanthanum solidify;
- a second stabilized alumina grains comprising theta-alumina grains in which from 0.1 to 3 % mole of neodymium based on the theta-alumina grains and from 0.01 to 40 times by mole of barium based on the neodymium solidify;
- a third stabilized alumina grains comprising a mixture of gamma-alumina grains, delta-alumina grains and theta-alumina grains in which from 0.1 to 3 % by mole of lanthanum based on the mixture and from 0.01 to 40 times by mole of barium based on the lanthanum solidify; and
- a fourth stabilized alumina grains comprising a mixture of gamma-alumina grains, delta-alumina grains and theta-alumina grains in which from 0.1 to 3 % by mole of neodymium based on the mixture and from 0.01 to 40 times by mole of barium based on the neodynium solidify.

It is believed that the rare earth element and alkali earth element for stabilizing the alumina grains solidify in the alumina grains in the form of their oxides. The rare earth element as the catalyst component and the rare earth element solidifying in the alumina grains may be of the same kind, or of different kinds.

A process for producing the exhaust gas purifying catalyst is hereinafter described briefly. The process comprises the following steps:

preparing alumina grains loaded on or formed as a catalyst support;

loading at least one oxide of rare earth element on the alumina grains; and loading rhodium and at least one of platinum and palladium on the oxide of rare earth element.

Alumina grains may be formed into pellets serving as a catalyst support.

Otherwise, a catalyst support like a monolithic catalyst support having passages may be used. In the latter case, alumina grains may be coated on the catalyst support by the following method to form a catalyst component carrier on the catalyst support.

The catalyst support is first immersed into alumina grains in a slurry state to adhere the alumina grains on it, and then the catalyst support is calcined to form the catalyst component carrier layer made of the alumina grains.

The oxide of rare earth element, rhodium and either one of platinum or palladium or both of platinum and palladium may be loaded on the alumina grains by the following method:

First, the catalyst support is immersed into aqueous solutions of water soluble compounds of the catalyst components, or it is brought into contact with the aqueous solutions of water soluble compounds of the catalyst components of spraying the solutions. Then, the catalyst support is dried.

As the oxide of rare earth element, the same oxide of rare earth element used in the exhaust gas purifying catalyst of this invention may be used in the production process of this invention. It is preferable to use cerium oxide accompanying either one of lanthanum oxide or neodymium oxide, forming a complex oxide with the cerium oxide, or a mixture of lanthanum oxide and neodymium oxide.

Major amount of rhodium is dispersed on the oxide of rare earth element by the following process:

The oxide of rare earth element is dispersed on the alumina grains beforehand. Then, the oxide of rare earth element which is dispersed on the alumina grains is brought into contact with an aqueous solution containing rhodium. Thus, major amount of rhodium is loaded on the oxide of rare earth element, not on the alumina grains.

Since major amount of rhodium is dispersed on the oxide of rare earth element, rhodium is prohibited to solidify in the alumina grains at a high temperature and rhodium crystal particles are suppressed to grow. As a result, the deterioration of the catalyst activity at a high temperature can be suppressed.

ADVANTAGES OF THE INVENTION

As described earlier, the exhaust gas purifying catalyst of this invention has rhodium mainly loaded on the oxide of rare earth element. Therefore, it is less likely that rhodium solidifies into the alumina grains. Especially, when the stabilized alumina grains in which a rare earth element and an alkali earth element solidify are used, it is much less likely that rhodium solidifies into the alumina grains. Hence, rhodium works as a highly active catalyst ingredient even at a high temperature and it is possible to maintain a superior catalyst performance.

Further, when cerium oxide accompanying lanthanum oxide, neodymium oxide or a mixture of lanthanum oxide and neodymium oxide is used as the oxide of rare earth element, the sintering of cerium oxide at a high temperature is suppressed since the cerium oxide forms a complex oxide with lanthanum oxide, neodymium oxide or a mixture of lanthanum oxide and neodymium oxide. Furthermore, sintering of palladium is also restricted since palladium forms a complex oxide $PdO \cdot Ln_2 O_3$ ("Ln" means lanthanum, neodymium or a mixture of lanthanum and neodymium.) with lanthanum oxide, neodymium oxide or a mixture of lanthanum oxide and neodymium oxide.

Thus, the durability of the exhaust gas purifying catalyst of the present invention increases since the sintering of rhodium and the oxide of rare earth element is suppressed. It is less likely that the catalytic activity of rhodium disappears due to the solidification of rhodium in the alumina grains. And it is also less likely that the catalytic activity of rhodium deteriorates when the exhaust gas purifying catalyst is used at a high temperature. Consequently, the exhaust gas purifying catalyst of this invention has excellent durability as well as high activity.

In addition, the process of this invention allows to produce the exhaust gas purifying catalyst of this invention described above efficiently and without failure.

DETAILED DESCRIPTION OF THE PREFERRED EMBODIMENT

First Preferred Embodiment

An exhaust gas purifying catalyst (a platinum-rhodium 3-way catalyst) according to this invention as prepared by the production process of this invention as hereinafter described.

Catalyst No. 1

An aqueous solution of lanthanum nitrate was impregnated into alumina grains having a specific surface of 160 m²/gram in an amount of 1 % by mole of lanthanum based on the alumina grains. After the alumina grains were dried to remove water, the alumina grains were calcined to have lanthanum contained therein at 600° C. for 3 hours in air.

Next, an aqueous solution of barium nitrate was impregnated into the alumina grains in an amout of 1 % by mole of barium based on the alumina grains. Thus, gamma-alumina grains containing lanthanum and barium were made. And the gamma-alumina grains were calcined at 1000° C. for 3 hours in air to prepare stabilized alumina grains.

Then, one hundred parts of the stabilized alumina grains and 14 parts of a commerically available aluminum nitrate were pulverised with water and nitric acid by a ball mill to make wash coat slurry. And a monolithic catalyst support made of cordierite having approximately 400 passages per 1 in.² of cross sectional area was immersed into the wash coat slurry. And then, excessive liquid was blown off the monolithic catalyst support by a compressed air. After the monolithic catalyst support was dried to remove water, the monolithic catalyst support was calcined at 700° C. for 1 hour to form a catalyst component carrier layer made of the stabilized alumina grains having approximately 50 μM thickness thereon.

Next, the monolithic catalyst support coated with the catalyst component carrier layer made of the stabilized alumina grains was immersed into an aqueous solution of 2.5 mole/liter cerium nitride. After drying the monolithic catalyst support, the monolithic catalyst support was calcined at 600° C. for 3 hours in air to have 0.3 mole of cerium oxide per a catalyst support of 1 liter volume loaded on the monolithic catalyst support. Then, the monolithic catalyst support was immersed into an aqueous solution of 0.002 mole/liter rhodium chloride. After drying the monolithic catalyst support, the monolithic catalyst support was calcined at 200° C. for 1 hour to have 0.3 gram of rhodium per a catalyst support of 1 liter volume loaded on the monolithic catalyst support. The particle size of rhodium generated was 1.5 nm. The data was obtained from the results of measurement by the carbon monoxide chemisorption pulse method recommended by the Catalyst Committee of Japan Catalyst Society.

And then, the monolithic catalyst support was immersed into an aqueous solution (acidic with nitric acid) of 0.005 mole/liter dinitrodiammine platinum. After drying the monolithic catalyst support, the monolithic catalyst support was calined at 200° C. for 1 hour to have 1.5 gram of platinum per a catalyst support of 1 liter volume loaded on the monolithic catalyst support. Thus, Catalyst No. 1, an exhaust gas purifying catalyst (a platinum-rhodium 3-way catalyst) according to this invention, was prepared.

Comparative Catalyst No. 101 (3-way catalyst for comparison)

Comparative Catalyst No. 101 was prepared for comparison. It was prepared by the same method for preparing Catalyst No. 1 except the order of loading operations of the oxide of cerium and rhodium. The loading operations of the oxide of cerium and rhodium were performed in the reverse order when preparing Comparative Catalyst No. 101; i.e. rhodium was loaded on the monolithic catalyst support before loading the oxide of cerium thereon.

The two catalysts, Catalyst No. 1 and Comparative Catalyst No. 101, were mounted respectively on an exhaust system of 2.8 liter engine. And a durability test was performed for 200 hours. The temperature of the catalysts were approximately 950° C. during the durability test. After the durability test, the temperature of the exhaust gas at the inlet of the catalyst was set to two different temperatures; i.e. 300° C. and 350° C. And then, the conversions of HC, CO, and NOx were measured under these conditions. The results are shown in Table 1.

It is apparent from Table 1 that Catalyst No. 1 of the first preferred embodiment had a high catalytic activity at both the lower temperature of 300° C. and the higher temperature of 350° C. even after the severe aging; i.e. at 950° C. for 200 hours. On the other hand, Comparative Catalyst No. 101 had the lower conversions for all of HC, CO and NOx than those of Catalyst No. 1. Comparative catalyst No. 101 showed extremely low conversions of 21%, 25% and 27% for HC, CO and NOx respectively at 300° C. Hence, it is understood that the catalytic activity of Comparative Catalyst No. 101 had deteriorated.

TABLE 1

| Catalyst No. | Conversion (%) | | | | | |
|---|---|---|---|---|---|---|
| | 300° C. | | | 350° C. | | |
| | HC | CO | NOx | HC | CO | NOx |
| 1 | 60 | 72 | 68 | 94 | 98 | 92 |
| 101 | 21 | 25 | 27 | 86 | 69 | 73 |

Second Preferred Embodiment

Catalysts No. 2 through No. 12 according to this invention having different loading amounts of cerium, platinum and rhodium were prepared by the same preparation method for Catalyst No. 1 of the first preferred embodiment. And Comparative Catalysts No. 102 through No. 107 having loading amounts of cerium, platinum or rhodium deviating from the rage of this invention were also prepared by the same preparation method for Catalyst No. 1 of the first preferred embodiment.

After the preparation, Catalysts No. 2 through No. 12 and Comparative Catalysts No. 102 through No. 107 were aged at 1200° C. for 10 hours in an engine exhaust gas having 5% oxygen concentration. And then, the catalysts were mounted to a laboratory reactor, and a gas simulating an exhaust gas was blown to the catalysts at 100,000 per hour (GHSV: Gas Hourly Space Velocity) while increasing the temperature by 5° C. per minute. The gas consisted of 0.7% of carbon monoxide (CO), 0.233% of hydrogen ($H_2$), 0.646% of oxygen ($O_2$), and 1600 ppm (THC: Total Hydrocarbons) of propylene ($C_3H_6$), 1200 ppm of nitrogen oxide (NOx), 10% of carbon dioxide ($CO_2$), 10% of water ($H_2O$) and balance of nitrogen ($N_2$). The conversions of HC, CO and NOx were measured by intervals of temperature increment. In Table 2, temperatures are shown at which HC, CO and NOx were purified by 50%.

It is understood from Table 2 that the catalytic activities of Catalysts No. 2 through No. 12 were superior to those of Comparative Catalysts No. 102 through No. 107. In the purifying activities for HC and CO, Catalysts No. 2 through No. 12 loading from 0.01 to 3.0 mole of cerium per a catalyst support of 1 liter volume were superior to Comparative Catalyst No. 102 loading less than 0.01 mole of cerium per a catalyst support of 1 liter volume. And also in the purifying activity for HC, Catalysts No. 2 through No. 12 were superior to Comparative Catalyst No. 103 loading more than 3.0 mole of cerium per a catalyst support of 1 liter volume. Further, Catalysts No. 2 through No. 12 loading from 0.04 gram to 5.0 gram of platinum per a catalyst support of 1 liter volume had a better catalytic activity than that of Comparative Catalysts No. 104 and No. 105 loading platinum deviating out of the range. Furthermore, Catalysts No. 2 through No. 12 loading from 0.004 to 1.0 gram of rhodium per a catalyst support of 1 liter volume had a better catalytic activity than that of Comparative Catalysts No. 106 and No. 107 loading rhodium deviating out of the range.

TABLE 2

| Catalyst No. | Loading Amount | | | Temp. (°C.) at purifying by 50% | | |
|---|---|---|---|---|---|---|
| | Ce(mol/l) | Pt(g/l) | Rh(g/l) | HC | CO | NOx |
| 2 | 0.02 | 1.5 | 0.3 | 263 | 242 | 252 |
| 3 | 0.08 | 1.5 | 0.3 | 259 | 228 | 250 |
| 4 | 0.15 | 1.5 | 0.3 | 248 | 223 | 248 |
| 5 | 0.3 | 1.5 | 0.3 | 255 | 225 | 250 |
| 6 | 0.8 | 1.5 | 0.3 | 262 | 226 | 253 |
| 7 | 1 | 1.5 | 0.3 | 275 | 224 | 251 |
| 8 | 0.3 | 0.05 | 0.3 | 280 | 278 | 274 |
| 9 | 0.3 | 0.1 | 0.3 | 270 | 275 | 264 |
| 10 | 0.3 | 0.5 | 0.3 | 268 | 260 | 258 |
| 11 | 0.3 | 1 | 0.3 | 260 | 227 | 251 |
| 12 | 0.3 | 1.5 | 0.5 | 248 | 225 | 240 |
| 102 | 0.005 | 1.5 | 0.3 | 289 | 254 | 251 |
| 103 | 5 | 1.5 | 0.3 | 278 | 225 | 253 |
| 104 | 0.3 | 0.01 | 0.3 | 290 | 280 | 285 |
| 105 | 0.3 | 6 | 0.3 | 285 | 236 | 273 |
| 106 | 0.3 | 1.5 | 0.001 | 280 | 236 | 298 |
| 107 | 0.3 | 1.5 | 1.5 | 268 | 246 | 253 |

Third Preferred Embodiment

An exhaust gas purifying catalyst (a palladium-rhodium 3-way catalyst) according to this invention was prepared by the production process of this invention as hereinafter described.

Catalyst No. 13

An aqueous solution of lanthanum nitrate was impregnated into gamma-alumina grains having a specific surface of 160 m²/gram in an amount of 1% by mole of lanthanum based on the gamma-alumina grains. After the gamma-alumina grains were dried to remove water, the gamma-alumina grains were calcined at 600° C. for 3 hours in air to have lanthanum contained therein. Further, the gamma-alumina grains were calcined at 1000° C. for 3 hours in air to prepare a stabilized theta-alumina grains.

Then, 100 parts of the stabilized thetaalumina grains and 14 parts of a commerically available aluminum nitrate were pulverized with water and nitric acid by a ball mill to make wash coat slurry. And a monolithic catalyst support made of cordierite having approximately 400 passages per 1 in.² of cross sectional area was immersed into the wash coat slurry. And then, excessive liquid was blown off the monolithic catalyst support by a compressed air. After the monolithic catalyst support was dried to remove water, the monolithic catalyst support was calcined at 700° C. for 1 hour to from a catalyst component carrier layer made of the stabilized theta-alumina grains having approximately 50 μm thickness thereon.

Next, the monolithic catalyst support coated with the catalyst component carrier layer made of the stabilized theta-alumina grains was immersed into an aqueous solution of 3.3 mole/liter cerium nitrate. After drying the monolithic catalyst support, the monolithic catalyst support was calcined at 600° C. for 3 hours in air to have 0.4 mole of cerium oxide per a catalyst support of 1 liter volume loaded on the monolithic catalyst support. Then, the monolithic catalyst support was immersed into an aqueous solution of 0.004 mole/liter rhodium chloride. After drying the monolithic catalyst support, the monolithic catalyst support was calcined at 200° C. for 1 hour to have 0.6 gram of rhodium per a catalyst support of 1 liter volume loaded on the monolithic catalyst support.

And then, the monolithic catalyst support was immersed into an aqueous solution (acidic with nitric acid) of 0.005 mole/liter dinitrodiammine palladium. After drying the monolithic catalyst support, the monolithic catalyst support was calcined at 200° C. for 1 hour to have 1.5 gram of palladium per a catalyst support of 1 liter volume loaded on the monolithic catalyst support. Thus, Catalyst No. 13, an exhaust gas purifying catalyst (a palladium-rhodium 3-way catalyst) according to this invention, was prepared.

Comparative Catalyst No. 108 (3-way catalyst for comparison)

Comparative Catalyst No. 108 was prepared for comparison. It was prepared by the same method for preparing Catalyst No. 13 except the order of loading operations of the oxide of cerium and rhodium. The loading operations of the oxide of cerium and rhodium were performed in the reverse order when preparing Comparative Catalyst No. 108; i.e. rhodium was loaded on the monolithic catalyst support before loading the oxide of cerium thereon.

The two catalysts, Catalyst No. 13 and Comparative Catalyst No. 108, were mounted respectively on an exhaust system of 2.8 liter engine. And a durability test was performed for 200 hours. The temperature of the catalysts were approximately 950° C. during the durability test. After the durability test, the temperature of the exhaust gas at the inlet of the catalyst was set to two different temperatures; i.e 300° C. and 350° C. And then, the conversions of HC, CO and NOx were measured under these conditions. The results are shown in Table 3.

It is apparent from Table 3 that Catalyst No. 13 of the third preferred embodiment had an extremely higher catalytic activity at both the lower temperature of 300° C. and the higher temperature of 350° C. than that of Comparative Catalyst No. 108 even after the severe aging; i.e. at 950° C. for 200 hours.

TABLE 3

| Catalyst No. | Conversion (%) | | | | | |
|---|---|---|---|---|---|---|
| | 300° C. | | | 350° C. | | |
| | HC | CO | NOx | HC | CO | NOx |
| 13 | 65 | 78 | 57 | 98 | 99 | 89 |
| 108 | 26 | 30 | 19 | 88 | 76 | 68 |

Fourth Preferred Embodiment

An exhaust gas purifying catalyst (a palladium-platinum-rhodium 3-way catalyst) according to this invention was prepared by the production process of this invention as hereinafter described.

Catalyst No. 14

An aqueous solution of lanthanum nitrated was impregnated into alumina grains having a specific surface of 158 m$^2$/gram in an amount of 1% by mole of lanthanum based on the alumina grains. After the alumina grains were dried to remove water, the alumina grains were calcined at 600° C. for 3 hours to have lanthanum contained therein.

Next, an aqueous solution of barium nitrate was impregnated into the alumina grains in an amount of 1% by mole of barium based on 99% by mole of the alumina grains. Thus, alumina grains containing lanthanum and barium were made. And the alumina grains were calcined at 870° C. for 3 hours in air to prepare stabilized alumina grains.

Then, 100 parts of the stabilized alumina grains and 18 parts of commercially available aluminum nitrate were pulverized with water and acetic acid by a ball mill to make wash coat slurry. And a monolithic catalyst support made of cordierite having approximately 400 passages per 1 in.$^2$ of cross sectional area was immersed into the wash coat slurry. And then, excessive liquid was blown off the monolithic catalyst support by a compressed air. After the monolithic catalyst support was dried to remove water, the monolithic catalyst support was calcined at 650° C. for 1 hour to form a catalyst component carrier layer made of theta-alumina grains having approximately 50 μm thickness thereon.

Next, the monolithic catalyst support coated with the catalyst component carrier layer made of the theta-alumina grains were immersed into an aqueous solution of 3.0 mole/liter cerium nitrate. After drying the monolithic catalyst support, the monolithic catalyst support was calcined at 600° C. for 3 hours in air to 1 liter volume loaded on the monolithic catalyst support. Then, the monolithic catalyst support was immersed into an aqueous solution of 0.002 mole/liter rhodium chloride. After drying the monolithic catalyst support, the monolithic catalyst support was calcined at 200° C. for 1 hour to have 0.3 gram of rhodium per a catalyst support of 1 liter volume loaded on the monolithic catalyst support.

And then, the monolithic catalyst support was immersed into a mixture (acidic with nitric acid) of an aqueous solution of 0.003 mole/liter dinitrodiammine platinum and an aqueous solution of 0.003 mole/liter palladium nitrate. After drying the monolithic catlyst support, the monolithic catalyst support was calcined at 250° C. for 1 hour to have 1.0 gram of platinum and 0.5 gram of palladium per a catalyst support of 1 liter volume loaded on the monolithic catalyst support. Thus, Catalyst No. 14, an exhaust gas purifying catalyst (a palladium-platinum-rhodium 3-way catalyst) according to this invention, was prepared.

Comparative Catalyst No. 109 (3-way catalyst for comparison)

Comparative Catalyst No. 109 was prepared for comparison. It was prepared by the same method for preparing Catalyst No. 14 except the order of loading operations of the oxide of cerium and rhodium. The loading operations of the oxide of cerium and rhodium were performed in the reverse order when preparing Comparative Catalyst No. 109; i.e. rhodium was loaded on the monolithic catalyst support before loading the oxide of cerium thereon.

The two catalysts, Catalyst No. 14 and Comparative Catalyst No. 109, were mounted respectively on an exhaust system of 0.2 liter engine. And a durability test was performed for 100 hours. The airfuel ratio (A/F) was set to 14.6 and the temperature of the catalysts were approximately 950° C. during the durability test. After the durability test, the two catalysts, Catalyst No. 14 and Comparative Catalyst No. 109, were mounted respectively on an identical engine. And then, the conversions of HC, CO and NOx were measured under the following conditions:

Engine speed: 2000 rpm,

Negative pressure of intake manifold: 360 mmHg.

The conversions of HC, CO and NOx were measured at three air-fuel rations; i.e. 14.0, 14.6 and 15.0. The results are shown in Table 4.

It is apparent from Table 4 that Catalyst No. 14 of the fourth preferred embodiment had a higher catalytic activity than that of Comparative Catalyst No. 109. Particularly, it is remarkable that Catalyst No. 14 had a high purifying activity for Nox.

TABLE 4

| Cata- | Conversion (%) | | | | | | | | |
|---|---|---|---|---|---|---|---|---|---|
| lyst | A/F = 14.0 | | | A/F = 14.6 | | | A/F = 15.0 | | |
| No. | HC | CO | NOx | HC | CO | NOx | HC | CO | NOx |
| 14 | 85 | 72 | 95 | 93 | 75 | 87 | 96 | 87 | 56 |
| 109 | 81 | 70 | 78 | 90 | 72 | 74 | 94 | 82 | 38 |

Fifth Preferred Embodiment

An exhaust gas purifying catalyst (a palladium-rhodium-cerium-lanthanum 3-way catalyst) according to this invention was prepared by the production process of this invention as hereinafter described.

Catalyst No. 15

One hundred parts of alumina grains and 14 parts of a commercially available aluminum nitrate were pulverized with water and nitric acid by a ball mill to make wash coat slurry. And a monolithic catalyst support made of cordierite having approximately 400 passages per 1 in.$^2$ of cross sectional area was immersed into the wash coat slurry. Then, excessive liquid was blown off the monolithic catalyst support by a compressed air. After the monolithic catalyst support was dried to remove water, the monolithic catalyst support was calcined at 700° C. for 1 hour to form a catalyst component carrier layer made of the alumina grains having approximately 50 μm thickness thereon.

Next, the monolithic catalyst support coated with the catalyst component carrier layer made of the alumina grains was immersed into an aqueous solution of 2.5 mole/liter cerium nitrate. After drying the monolithic catalyst support, the monolithic catalyst support was again immersed into an aqueous solution of 1.7 mole/liter lanthanum nitrate. After drying the monolithic catalyst support, the monolithic catalyst support was calcined at 600° C. for 3 hours in air to have 0.3 mole of cerium oxide and 0.2 mole of lanthanum oxide per a catalyst support of 1 liter volume loaded on the monolithic catalyst support. Then, the monolithic catalyst support was immersed into an aqueous solution of 0.002 mole/liter of rhodium chloride. After drying the monolithic catalyst support, the monolithic catalyst support was calcined at 200° C. for 1 hour to have 0.3 gram of rhodium per a catalyst support of 1 liter volume loaded on the monolithic catalyst support.

And then, the monolithic catalyst support was immersed into an aqeuous solution (acidic with nitric acid) of 0.009 mole/liter dinitrodiammine palladium. After drying the monolithic catalyst support, the monolithic catalyst support was calcined to have 1.5 gram of palladium per a catalyst support of 1 liter volume loaded on the monolithic catalyst support at 200° C. for 1 hour. Thus, Catalyst No. 15, an exhaust gas purifying catalyst (a palladium-rhodium-cerium-lanthanum 3-way catalyst) according to this invention, was prepared.

Comparative Catalyst No. 110 (3-way catalyst for comparison)

Comparative Catalyst No. 110 was prepared for comparision. It was prepared by the same method for preparing Catalyst No. 15 except the order of loading operations of the oxide of rare earth element and rhodium. The loading operations of the oxide of rare earth element and rhodium were performed in the reverse order when preparing Comparative Catalyst No. 110; i.e. rhodium was loaded on the monolithic catalyst support before loading the oxides of cerium and lanthanum thereon.

The two catalysts, Catalyst No. 15 and Comparative Catalyst No. 110, were mounted respectively on an exhaust system of 2.8 liter engine. And a durability test was performed for 200 hours. The temperature of the catalysts were approximately 800° C. during the durability test. After the durabilility test, the temperature of the exhaust gas at the inlet of the catalyst was set to two different temperatures; i.e. 300° C. and 350° C. And then, the conversions of HC, CO, and Nox were measured under these conditions. The results are shown in Table 5.

It is apparent from Table 5 that Catalyst No. 15 of the fifth preferred embodiment had a high catalytic activity at both the lower temperature of 300° C. and the higher temperature of 350° C. even after the severe aging; i.e. at 800° C. for 200 hours. On the other hand, Comparative Catalyst No. 110 showed lower conversions for all of HC, CO and NOx than those of Catalyst No. 15. Comparative Catalyst No. 110 showed extremely low conversions of 26%, 28% and 29% for HC, CO and NOx respectively at 300° C. Hence, it is understood that the catalytic activity of Comparative Catalyst No. 110 had deteriorated.

TABLE 5

| Catalyst No. | Conversion (%) | | | | | |
|---|---|---|---|---|---|---|
| | 300° C. | | | 350° C. | | |
| | HC | CO | NOx | HC | CO | NOx |
| 15 | 62 | 73 | 69 | 96 | 97 | 93 |
| 110 | 26 | 28 | 29 | 88 | 70 | 75 |

Sixth Preferred Embodiment

An exhaust gas purifying catalyst (a palladium-rhodium-cerium-lanthanum 3-way catalyst) according to this invention was prepared by the production process of this invention as hereinafter described.

Catalyst No. 16

An aqueous solution of lanthanum nitrate was impregnated into alumina grains having a specific surface of 160 m$^2$/gram in an amount of 1.3% by mole of lanthanum based on the alumina grains. After the alumina grains were dried to remove water, the alumina grains were calcined at 600° C. for 3 hours in air to have lanthanum contained therein. Then, the alumina grains were further calcined at 870° C. for 3 hours in air to prepare a stabilized alumina grains. And then, the stabilized alumina grains were pulverized to alumina powers having an average grain diameter of 10 μm by a vibration mill.

Then, 4 Kg of the alumina powders and 960 gram of lanthanum carbonate were put into 5.16 Kg of an aqueous solution of aluminum nitrate having a concentration of 0.3 mole/liter and the mixture was pulverized by a ball mill to make wash coat slurry. And, a monolithic catalyst support made of cordierite having approximately 400 passages per 1 in.$^2$ of cross sectional area was immersed into the wash coat slurry. And then, excessive liquid was blown off the monolithic catalyst support by a compressed air. After the monolithic catalyst support was dried to remove water, the monolithic catalyst support was calcined at 700° C. for 1 hour to form a catalyst component carrier layer made of the alumina powders containing the lanthanum and having approximately 50 μm thickness thereon.

Next, the monolithic catalyst support coated with the catalyst component carrier layer made of the alumina powders containing the lanthanum was immersed into an aqueous solution of 2.5 mole/liter cerium nitrate. After drying the monolithic catalyst support, the monolithic catalyst support was calcined at 600° C. for 3 hours in air to have 0.3 mole of cerium oxide per a catalyst support of 1 liter volume loaded on the monolithic catalyst support. Then, the monolithic catalyst support was immersed into an aqueous solution of 0.002 mole/liter rhodium nitrate. After drying the monolithic catalyst support, the monolithic catalyst support was calcined at 200° C. for 1 hour to have 0.3 gram of rhodium per a catalyst support of 1 liter volume loaded on the monolithic catalyst support. And then, the monolithic catalyst support was immersed into an aqueous solution (acidic with hydrochloric acid) of 0.009 mole/liter palladium chloride. After drying the monolithic catalyst support, the monolithic catalyst support was calcined at 200° C. for 1 hour to have 1.5 gram of palladium per a catalyst support of 1 liter volume loaded on the monolithic catalyst support. Thus, Catalyst No. 16, an exhaust gas purifying catalyst (a palladium-rhodium-cerium-lanthanum 3-way catalyst) accordng to this invention, was prepared.

Comparative Catalyst No. 111 (3-way catalyst for comparison)

Comparative Catalyst No. 111 was prepared for comparison. It was a 3-way catalyst free from lanthanum oxide and prepared by the same method for preparing Catalyst No. 16 escept that the monolithic catalyst support made of cordierite was immersed into the wash coat slurry free from lanthanum carbonate.

After the preparation, Catalysts No. 16 and Comparative Catalyst No. 111 were aged at 1000° C. for 10 hours in an engine exhaust gas having 5% oxygen concentration. And then, the catalysts were mounted to a laboratory reactor, and a gas simulating an exhaust gas was blown to the catalysts at 100,000 per hour (GHSV: Gas Hourly Space Velocity) while increasing the temperature by 5° C. per minute. The gas consisted of 0.7% of carbon monoxide (CO), 0.233% of hydrogen ($H_2$), 0.646%, of oxygen ($O_2$), and 1600 ppm (THC; Total Hydrocarbons) of propylene ($C_3H_6$), 1200 ppm of nitrogen oxide (NOx), 10% of carbon dioxide ($Co_2$), 10% of water ($H_2O$) and balance of nitrogen ($N_2$). The conversions of HC, CO and NOx were measured by intervals of temperature increment. In Table 6, temperatures are shown at which HC, CO and NOx were purified by 50%.

It is understood from Table 6 that the catalytic activity of Catalyst No. 16 was superior to that of Comparative Catalyst No. 111 after the degradation under the conditions described above; i.e. at 1000° C. for 10 hours in an engine exhaust gas having 5% oxygen concentration.

After the catalytic activity mesurement, Catalyst No. 16 of the sixth preferred embodiment was analyzed. The analysis showed that the cerium formed a double oxide with the lanthanum in Catalyst No. 16, and that the average grain diameter of the cerium oxide was 100 angstroms in Catalyst No. 16 and 250 angstroms in Comparative Catalyst No. 111. Therefore, it is understood that the sintering of the cerium oxide was less in Catalyst No. 16 of the sixth preferred embodiment containing lanthanum than that in Comparative Catalyst No. 111 free from lanthanum. The analysis also showed that the average particle size of the palladium was 107 angstroms in Catalyst No. 16 and 176 angstroms in Comparative Catalyst No. 111. Here again, it is understood that the sintering of the palladium was less in Catalyst No. 16 of the sixth preferred embodiment containing lanthanum than that in Comparative Catalyst No. 111 free from lanthanum.

TABLE 6

| Catalyst | Conversion (%) Temp. (°C.) at purifying by 50% | | |
|---|---|---|---|
| No. | HC | CO | NOx |
| 16 | 278 | 261 | 252 |
| 111 | 354 | 308 | 315 |

Seventh Preferred Embodiment

Catalysts No. 17 through No. 22 of this seventh preferred embodiment were prepared by the same preparation method for Catalyst No. 15 of the fifth preferred embodiment. As shown in Table 7, Catalysts No. 17 through No. 22 all loaded 0.3 mole/liter of cerium, 1.5 gram/liter of palladium, 0.3 gram/liter of rhodium, but different amounts of lanthanum respectively. And Comparative Catalysts No. 112 and No. 113 were also prepared for comparison.

After the preparation, Catalysts No. 17 through No. 22 and Comparative Catalysts No. 112 and No. 113 were aged at 1100° C. for 10 hours in an engine exhaust gas having 2% oxygen concentration. After aging the catalysts, the purifying activities of the catalysts were measured and evaluated by the same method as for the second and sixth preferred embodiments. The results of the evaluation are shown in Table 7.

It is understood from Table 7 that the catalytic activities of Catalysts No. 17 through No. 22 were superior to those of Comparative Catalysts No. 112 and No. 113. In the purifying activities for HC and CO, Catalysts No. 17 through No. 22 loading from 0.02 to 1.0 mole of lanthanum per a catalyst support of 1 liter volume were superior to Comparative Catalyst No. 112 loading less than 0.02 mole of lanthanum per a catalyst support of 1 liter volume. And also in the purifying activity for HC, Catalysts No. 17 through No. 22 were superior to Comparative Catalyst No. 113 loading more than 1.0 mole of lanthanum per a catalyst support for 1 liter volume.

TABLE 7

| Catalyst | Loading Amount | | | Temp. (°C.) at purifying by 50% | | |
|---|---|---|---|---|---|---|
| No. | La(mol/l) | Pd(g/l) | Rh(g/l) | HC | CO | NOx |
| 17 | 0.02 | 1.5 | 0.3 | 275 | 253 | 265 |
| 18 | 0.08 | 1.5 | 0.3 | 270 | 230 | 265 |
| 19 | 0.15 | 1.5 | 0.3 | 258 | 236 | 259 |
| 20 | 0.3 | 1.5 | 0.3 | 268 | 238 | 262 |
| 21 | 0.8 | 1.5 | 0.3 | 279 | 238 | 268 |
| 22 | 1 | 1.5 | 0.3 | 284 | 236 | 263 |
| 112 | 0.005 | 1.5 | 0.3 | 291 | 263 | 264 |
| 113 | 5 | 1.5 | 0.3 | 288 | 234 | 267 |

Eighth Preferred Embodiment

An exhaust gas purifying catalyst (a palladium-rhodium-cerium-neodymium 3-way catalyst) according to this invention was prepared by the production process of this invention as hereinafter described.

Catalyst No. 23

One hudred parts of alumina grains and 14 parts of a commercially available aluminum nitrate were pulverized with water and nitric acid by a ball mill to make wash coat slurry. And a monolithic catalyst support made of cordierite having approximately 400 passages per 1 in.$^2$ of cross sectional area was immersed into the wash coat slurry. Then, excessive liquid was blown off the monolithic catalyst support by a compressed air. After the monolithic catalyst suport was dried to remove water, the monolithic catalyst support was calcined at 700° C. for 1 hour to form a catalyst component carrier layer made of the alumina grains having approximately 50 μm thickness thereon.

Next, the monolithic catalyst support coated with the catalyst component carrier layer made of the alumina grains was immersed into an aqueous solution of 2.5 mole/liter cerium nitrate. After drying the monolithic catalyst support, the monolithic catalyst support was immersed into an aqueous solution of 1.7 mole/liter neodymium nitrate. Then, the monolithic catalyst support was calcined at 600° C. for 3 hours in air to have 0.3 mole of cerium oxide and 0.2 mole of neodymium oxide per a catalyst support of 1 liter volume loaded on the monolithic catalyst support. And then, the monolithic catalyst support was immersed into an aqueous solution of 0.002 mole/liter rhodium chloride. After drying the monolithic catalyst support, the monolithic catalyst support was calcined to 200° C. for 1 hour to have 0.3 gram of rhodium per a catalyst support of 1 liter volume loaded on the monolithic catalyst support. Following the loading of rhodium, the monolithic catalyst support was immersed into an aqueous solution (acidic with nitric acid) of 0.009 mole/liter of palladium nitrate. After drying the monolithic catalyst support, the monolithic catalyst support was calcined at 200° C. for 1 hour to have 1.5 gram of palladium per a catalyst support of 1 liter volume on the monolithic catalyst support of 1 liter volume on the monolithic catalyst support. Thus, Catalyst No. 23, an exhaust gas purifying catalyst (a palladium-rhodiumcerium-neodymium 3-way catalyst) according to this invention, was prepared.

Catalyst No. 24

Catalyst No. 24 was another exhaust gas purifying catalyst (a palladium-rhodium-cerium-neodymium/lanthanum 3-way catalyst) of the eighth preferred embodiment. It was prepared by the same method as for Catalyst No. 23 of the eighth preferred embodiment except that a mixture containing an equal amount of lanthanum nitrate and neodymium nitrate was used instead of using the neodymium nitrate only.

Comparative Catalyst No. 114 and No. 115 (3-way catalysts for comparison)

Comparative Catalysts No. 114 and No. 115 were prepared for comparison. It was prepared by the same method for preparing Catalysts No. 23 and No. 24 of the eighth preferred embodiment except the order of loading operations of the oxide of the rare earth element and rhodium. The loading operations of the oxide of rare earth element and rhodium were performed in the reverse order when preparing Comparative Catalysts No. 114 and No. 115; i.e. rhodium was loaded on the monolithic catalyst support before loading the oxide of rare earth element thereon.

The four catalysts, Catalysts No. 23 and No. 24 and Comparative Catalysts No. 114 and No. 115, were mounted respectively on an exhaust system of 2.0 liter engine. And a durability test was performed for 200 hours. The temperatures of the catalysts were approximately 900° C. during the durability test. After the durability test, the temperature of the exhaust gas at the inlet of the catalyst was set to two different temperatures; i.e. 300° C. and 350° C. And then, the conversions of HC, CO, and NOx were measured under these conditions. The results are shown in Table 8.

It is apparent from Table 8 that Catalysts No. 23 and No. 24 of the eighth preferred embodiment had a high catalytic activity at both the lower temperature of 300° C. and at the higher temperature of 350° C. even after the severe aging; i.e. at 900° C. for 200 hours.

TABLE 8

| Catalyst | Conversion (%) | | | | | |
| | 300° C. | | | 350° C. | | |
| No. | HC | CO | NOx | HC | CO | NOx |
| --- | --- | --- | --- | --- | --- | --- |
| 23 | 67 | 80 | 61 | 99 | 98 | 90 |
| 24 | 63 | 76 | 53 | 98 | 98 | 88 |
| 114 | 28 | 32 | 21 | 89 | 78 | 71 |
| 115 | 28 | 29 | 22 | 87 | 75 | 70 |

Ninth Preferred Embodiment

An exhaust gas purifying catalyst (a palladium-rhodium-lanthanum-cerium 3-way catalyst) according to this invention was prepared by the production process of this invention as hereinafter described.

Catalyst No. 25

An aqueous solution of lanthanum nitrate was impregnated into alumina grains having a specific surface of 158 m$^2$/gram in an amount of 1% by mole of lanthanum based on the alumina grains. After the alumina grains were dried to remove water, the alumina grains were calcined at 600° C. for 3 hours in air to have lanthanum contained therein.

Next, an aqueous solution of barium nitrate was impregnated into the alumina grains in an amount of 1% by mole of barium based on 99% by mole of the alumina grains. Thus, alumina grains containing lanthanum and barium were made. And the alumina grains were calcined at 870° C. for 3 hours in air to prepare stabilized alumina grains.

Then, 500 gram of the stabilized alumina grains and 45 gram of cerium carbonate and 80 gram of lanthanum carbonate were dispersed in 670 gram of 0.3 mole/liter aluminum nitrate. After stirring the mixture, the mixture was wet-pulverized by a ball mill to make wash coat slurry for 15 hours. And a monolithic catalyst support made of cordierite having approximately 400 passages per 1 in.$^2$ of cross sectional area was immersed into the wash coat slurry. And then, excessive liquid was blown off the monolithic catalyst support by a compressed air. After the monolithic catalyst support was dried to remove water, the monolithic catalyst support was calcined at 650° C. for 1 hour to form a catalyst component carrier layer made of theta-alumina grains containing lanthanum and cerium and having approximately 50 μm thickness thereon.

Next, the monolithic catalyst support coated with the catalyst component carrier layer made of the theta-alumina grains was immersed into an aqueous solution of 0.002 mole/liter of rhodium chloride. After drying the monolithic catalyst support, the monolithic catalyst support was calcined at 200° C. for 1 hour to have 0.3 gram of rhodium per a catalyst support of 1 liter volume loaded on the monolithic catalyst support. And then, the monolithic catalyst support was immersed into an aqueous solution (acidic with nitric acid) of 0.012 mole/liter of dinitrodiammine palladium. After drying the monolithic catalyst support, the monolithic catalyst support was calcined at 250° C. for 1 hour to have 2.0 gram of palladium per a catalyst support of 1 liter volume loaded on the monolithic catalyst support. Thus, Catalyst No. 25, an exhaust gas purifying catalyst (a palladium-rhodium-cerium-lanthanum 3-way catalyst) according to this invention, was prepared.

Comparative Catalyst No. 116 (3-way catalyst for comparison)

Comparative Catalyst No. 116 was prepared for comparison. It was prepared with the same catalyst components and by the same method for preparing Catalyst No. 25 of the ninth preferred embodiment except that the monolithic catalyst support was coated with a catalyst component carrier layer made of theta-alumina grains free from lanthanum carbonate but containing cerium carbonate only.

The two catalysts, Catalyst No. 25 and Comparative Catalyst No. 116, were mounted respectively on an exhaust system of 2.0 liter engine. And a durability test were performed for 100 hours. The air-fuel ratio (A/F) was set to 14.6 and the temperature of the catalysts were approximately 850° C. during the durability test. After the durability test, the two catalysts, Catalysts No. 25 and Comparative Catalyst No. 116, were mounted respectively on an identical engine. And then, the conversions of HC, CO and NOx were measured under the following conditions:

Engine speed: 2000 rpm,

Negative pressure of intake manifold: 360 mmHg.

The converions of HC, CO and NOx were measured at three air-fuel rations; i.e. 14.0, 14.6 and 15.0. The results are shown in Table 9.

It is apparent from Table 9 that Catalyst No. 25 of the ninth preferred embodiment containing not only cerium but also lanthanum had a higher catalytic activity than that of Comparative Catalyst No. 116. Particularly, it is remarkable that Catalyst No. 325 had a high purifying activity for NOx.

TABLE 9

| Catalyst No. | Conversion (%) | | | | | | | | |
|---|---|---|---|---|---|---|---|---|---|
| | A/F = 14.0 | | | A/F = 14.6 | | | A/F = 15.0 | | |
| | HC | CO | NOx | HC | CO | NOx | HC | CO | NOx |
| 25 | 84 | 73 | 96 | 95 | 78 | 86 | 98 | 89 | 54 |
| 116 | 80 | 71 | 79 | 93 | 74 | 73 | 95 | 85 | 37 |

What is claimed is:

1. An exhaust gas purifying catalyst sequentially comprising on alumina grains:
   (a) at least one rare earth element oxide,
   (b) rhodium, and
   (c) at least one of platinum and palladium.

2. An exhaust gas purifying catalyst according to claim 1 wherein the alumina grains are on a catalyst support.

3. An exhaust purifying catalyst according to claim 2 wherein a major amount of the rhodium is dispersed on the rare earth element oxide.

4. An exhaust gas purifying catalyst according to claim 3, wherein from 0.01 to 3.0 mole of said oxide of rare earth element, from 0.004 to 1.0 gram of said rhodium and from 0.04 to 5.0 gram of at least one of said platinum and palladium are loaded per said catalyst support of 1 liter volume.

5. An exhaust gas purifying catalyst according to claim 1, wherein said oxide of rare earth element is cerium oxide.

6. An exhaust gas purifying catalyst according to claim 2, wherien said rare earth element oxide comprises an neodymium oxide in the form of complex oxide with said cerium oxide.

7. An exhaust gas purifying catalyst according to claim 2, wherein said alumina grains are stabilized alumina grains in combination with at least one of a rare earth element and an alkali earth metal element in solid form.

8. An exhaust gas purifying catalyst according to claim 7, wherein said rare earth element is lanthanum and said alkali earth metal element is barium.

9. An exhaust gas purifying catalyst according to claim 8, wherein said stabilized alumina grains are theta-alumina grains, and from 0.1 to 3% by mole of lanthanum based on the theta-alumina grains and from 0.01 to 40 times by mole of barium based on the lanthanum are contained therein.

10. An exhaust gas purifying catalyst according to claim 7, wherein said rare earth element is neodymium and said alkali earth metal element is barium.

11. An exhaust gas purifying catalyst according to claim 10, wherein said stabilized alumina grains are theta-alumina grains, and from 0.1 to 3% by mole of neodymium based on the theta-alumina grains and from 0.01 to 40 times by mole of barium based on the neodymium are contained therein.

12. An exhaust gas purifying catalyst according to claim 8, wherein said stabilized alumina grains are a mixture of gamma-alumina grains, delta-alumina grains and theta-alumina grains, and from 0.1 to 3% by mole of lanthanum based on the mixture and from 0.01 to 40 times by mole of barium based on the lanthanum are contained therein.

13. An exhaust gas purifying catalyst according to claim 10, wherein said stabilized alumina grains are a mixture of gamma-alumina grains, delta-alumina grains and theta-alumina grains, and from 0.1 to 3% by mole of neodymium based on the mixture and from 0.01 to 40 times by mole of barium based on the neodymium are contained therein.

14. A process for producing an exhaust gas purifying catalyst comprising the steps of:
   coating alumina grains on a catalyst support;
   loading at least one rare earth element oxide on the alumina grains;
   loading rhodium on said rare earth element oxide; and
   loading at least one of platinum and palladium thereon.

15. A process for producing an exhaust gas purifying catalyst according to claim 14, wherein said oxide of rare earth element comprises cerium oxide and at least one of lanthanum oxide and neodymium oxide.

16. A process for producing an exhaust gas purifying catalyst according to claim 14, wherein said rare earth element oxide comprises cerium oxide and at least one of lanthanum oxide and neodymium oxide.

17. A process for producing an exhaust gas purifying catalyst comprising the steps of:
   coating a catalyst support with alumina grains by immersing the catalyst support in a slurry of the alumina grains;
   loading at least one rare earth element oxide on the alumina grains by immersing the thus-coated catalyst support in an aqueous solution containing at least one rare earth element, drying the resulting catalyst support and then calcining it;
   loading rhodium on said rare earth element oxide by immersing the thus-obtained catalyst support in an aqueous solution containing rhodium, drying the resulting catalyst support and then calcining it; and
   loading at least one of platinum and palladium thereon by immersing the thus-calcined catalyst support in an aqueous solution containing at least one of said platinum and said palladium, drying the thus-prepared catalyst support and calcining it.

* * * * *

UNITED STATES PATENT AND TRADEMARK OFFICE
CERTIFICATE OF CORRECTION

PATENT NO. : 4,843,056

DATED : June 27, 1989

INVENTOR(S) : Matsumoto, Shinichi et al

It is certified that error appears in the above-identified patent and that said Letters Patent is hereby corrected as shown below:

Column 17, line 31, "wherien" should read --wherein--;
          line 32, "an" should read --cerium oxide and at least one of lanthanum oxide and--.

Signed and Sealed this

Twenty-second Day of May, 1990

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,843,056

DATED : June 27, 1989

INVENTOR(S) : MATSUMOTO, SHINICHI, et al.

It is certified that error appears in the above-identified patent and that said Letters Patent is hereby corrected as shown below:

Title page, left column, item [73], second line, "Kenkusho" should read --Kenkyusho--.

Signed and Sealed this

Second Day of April, 1991

Attest:

HARRY F. MANBECK, JR.

*Attesting Officer*  *Commissioner of Patents and Trademarks*